United States Patent [19]
Getz

[11] Patent Number: 5,733,128
[45] Date of Patent: Mar. 31, 1998

[54] LANGUAGE LEARNING AID AND METHOD

[76] Inventor: Steven J. Getz, 0 S 351 Summit Dr., Winfield, Ill. 60190

[21] Appl. No.: 747,158
[22] Filed: Nov. 8, 1996
[51] Int. Cl.⁶ .................................................. G09B 19/06
[52] U.S. Cl. ........................... 434/157; 434/156; 434/322
[58] Field of Search ................................. 434/157, 156, 434/167, 428, 322; 283/46

[56] References Cited

U.S. PATENT DOCUMENTS

| | | |
|---|---|---|
| 1,271,856 | 7/1918 | Cook . |
| 1,678,621 | 7/1928 | Holmes .................................... 434/167 |
| 2,950,544 | 8/1960 | Leighton . |
| 3,055,118 | 9/1962 | Betancourt ........................... 434/157 X |
| 3,271,884 | 9/1966 | Roberson . |
| 4,112,595 | 9/1978 | Fernandez . |
| 4,604,063 | 8/1986 | Gurmarnik .............................. 434/157 |
| 5,178,542 | 1/1993 | Chigrinsky .............................. 434/157 |
| 5,275,569 | 1/1994 | Watkins .................................. 434/157 |

*Primary Examiner*—Jeffrey A. Smith
*Attorney, Agent, or Firm*—Don Moyer

[57] ABSTRACT

Realistic conversations are facilitated by a plurality of cards. Each card provides a set of questions and each card provides a cue which prompts facts needed to answer the questions. Each set of questions is ordered by a plurality of prompt classes. The plurality of prompt classes is ordered by how much of the answer form and answer fact is prompted by the prompt class.

10 Claims, 1 Drawing Sheet

LANGUAGE LEARNING AID AND METHOD

BACKGROUND

This invention aids language learning by providing questions, and cues for answering the questions, in order to facilitate realistic conversations, the questions being ordered by how much of the answer form and answer fact the question prompts.

One way children learn their native language is by engaging in conversations with adults and with other children. Typically these conversations use various classes of prompts. We ask a child, "Is this your nose?" as we prompt for a yes-or-no answer by pointing to the child's nose or ear. Typically we move on to less prompting, for example we get the child to repeat part of the question, when we ask, "Where is your nose? Is it on your arm, or is it on your face?" One way to aid learning a new language is to facilitate realistic conversations in a manner which explicitly uses ordered classes of prompting similar to what typically occurs as children learn their native language. Many language aids are shown in prior art but none of these show means for explicitly using ordered classes of prompting.

Devices such as that shown by Leighton in U.S. Pat. No. 2,950,544 and that shown by Gurmarnik in U.S. Pat. No. 4,604,063 facilitate communication between people who use different languages through questions and answers which are fully scripted except for choices which indicate the fact elicited and submitted. These are alternatives to conversation in one language, are devised to facilitate transfer of information, and are hot devised to aid language learning. The answer form is fully scripted and the answer fact is known only to the respondent.

Teaching aids such as the device shown by Cook in U.S. Pat. No. 1,271,856, the device shown by Roberson in U.S. Pat. No. 3,271,884, the device shown by Chigrinsky in U.S. Pat. No. 5,178,542, and the device shown by Watkins in U.S. Pat. No. 5,275,569 use word matching, phrase matching, and to and fro translation to teach vocabulary, syntax, grammar, pronunciation, and translation. These devices do not facilitate realistic conversation and do not make explicit use of ordered classes of prompting.

In the question-and-answer device shown by Fernandez in U.S. Pat. No. 4,112,595 scripted questions elicit answers in order to generate conversations. This does not disclose any ordering of sets of questions according to how much of the answer the question prompts. Also this does not disclose any means for providing cues which prompt facts for the answers elicited by a set of questions.

Thus there is an opportunity to create a new language learning aid which provides cues and corresponding sets of questions, with a set of questions being ordered according to how much of the answer form and the answer fact is prompted by the question.

SUMMARY

Objects of this invention include the following. Create a language learning aid which will facilitate realistic conversation in a new language. Create a language learning aid which provides sets of questions and provides cues which furnish facts for answering the questions. Order the questions by prompt classes which prompt answer forms and answer facts. Order the prompt classes by how much of the answer form and the answer fact they prompt.

In Summary, one embodiment of this invention has means for providing a plurality of sets of questions and a plurality of cues, each cue corresponding to a set of questions, a set of questions being ordered by a plurality of prompt classes, the plurality of prompt classes being ordered by how much of the answer form and the answer fact is prompted by the member of the plurality of prompt classes.

Other equivalent embodiments will be comprehended in the detailed description of the drawings, which will make additional equivalent embodiments obvious hereafter to persons skilled in the art.

DRAWINGS

DETAILED DESCRIPTION

Figure 1:
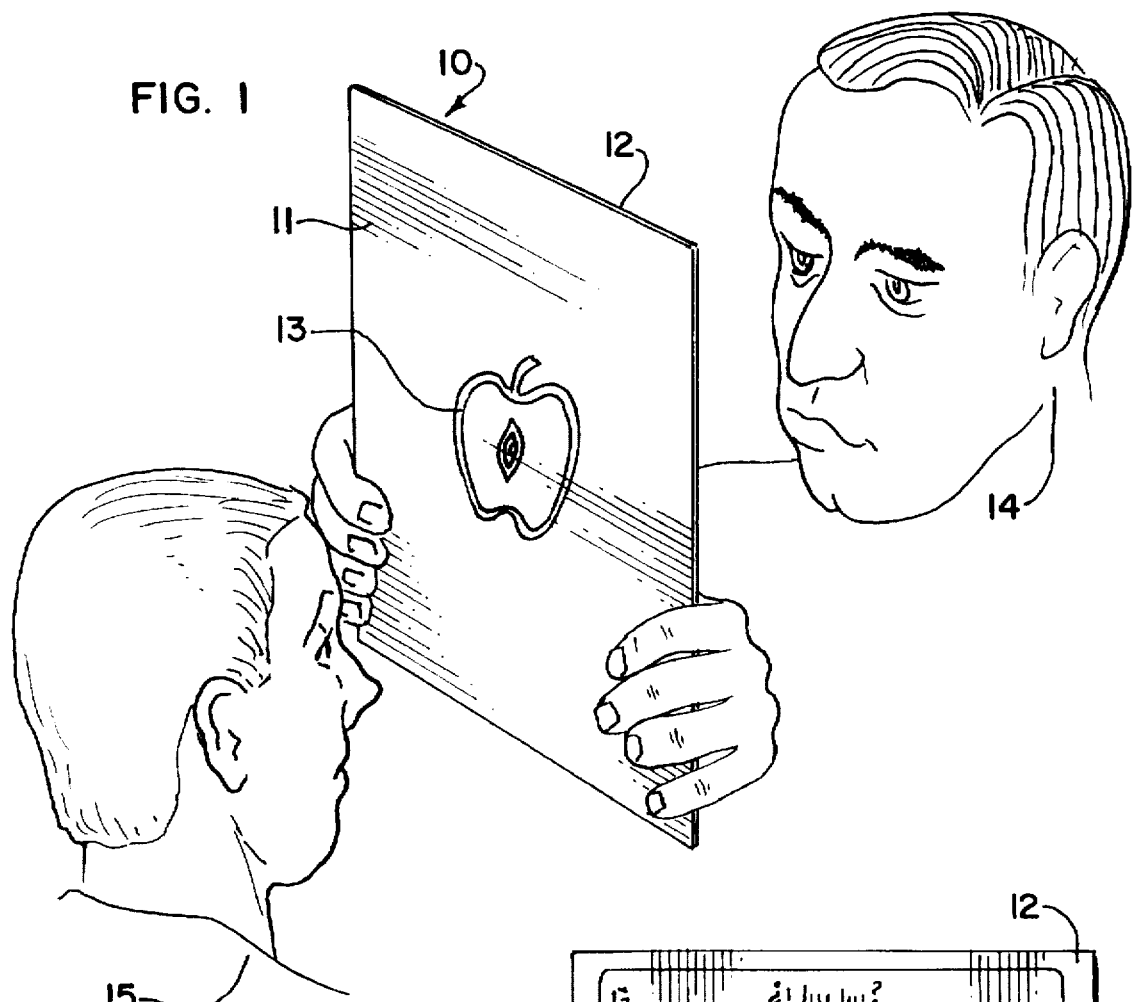
FIG. 1 shows the invention in the form of a card with a cue on the first surface.
Figure 2:
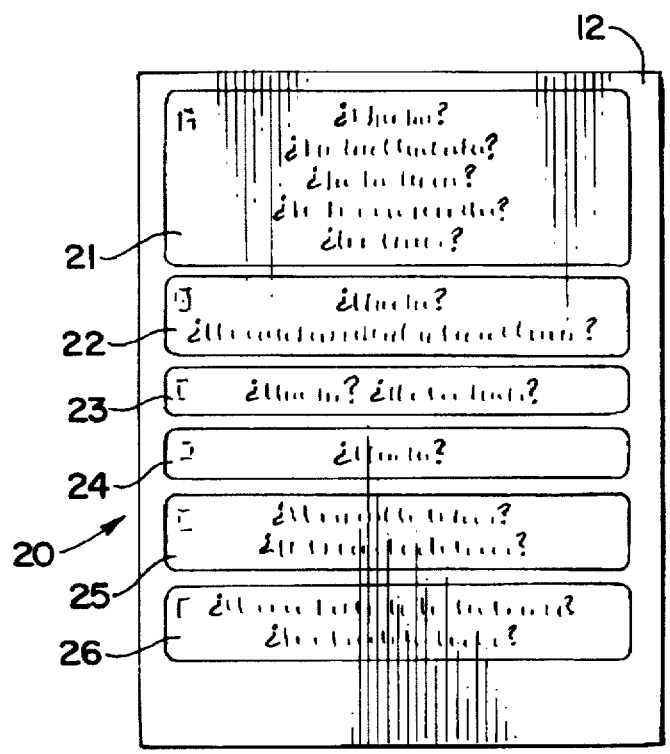
FIG. 2 shows the card with an ordered set of questions on the second surface.

An example of the preferred form of the new language learning aid 10 is shown in use in FIG. 1. This preferred form is a card which has a first surface 11 with a cue 13—here an image of an apple—provided on the first surface. The second surface 12 of the card is shown in FIG. 2. A set of questions 20 is provided on the second surface. Here the set of questions comprises six questions—a first question 21, a second question 22, a third question 23, a fourth question 24, a fifth question 25, and a sixth question 26.

In this example:

the first question 21 is —¿Ques es? ¿Es un banana? ¿Es un limon? ¿Es una manzana? ¿Es queso?

the second question 22 is—¿Que es? ¿Es una manzana o es un limon?

the third question 23 is—¿Que es? ¿Es un limon?

the fourth question 24 is —¿Que es?

the fifth question 25 is—¿A usted le gusta? ¿A usted le encata?

the sixth question 26 is—¿De que color es la manzana? ¿Es roja o es negra?

The preferred form of the new learning aid comprises a plurality of cards like the example. Groups of cards can have questions and cues related to symbols such as numbers and alphabets; things; places; actions; quantities such as distance, mass, and time; qualities such as color; adjectives; adverbs; and other features of language.

Each of these cards has a set of questions which correspond to the cue since the cue furnishes facts needed to answer the set of questions. The cues can be images, such as the apple 13 in FIG. 1. Cues also can be written and can be referential in that facts needed to answer the questions are furnished by something referred to by the cue. The cues and the set of questions can be on the same side of the card and the cues could be known things referred to by the set of questions, such as parts of a room.

These cards are the preferred form of general means for providing a plurality of sets of questions and means for providing a plurality of cues. Other means for providing a plurality of sets of questions and means for providing a plurality of dues, such as books, projected images, video tapes, computers, and the like will hereafter be obvious to people skilled in the art.

FIG. 1 shows a card in use. A first learner 14 reads a question and asks the question aloud. The second learner 15 listens to the question, observes the cue, and answers the question aloud. The first learner is practicing reading and speaking the language, and the second learner is practicing listening to and speaking the language. The learners can reverse rolls. A learner could use the learning aid alone. A teacher could take the role of either learner. In each case the questions and cues provided on the cards facilitate realistic conversations with ordered classes of promptings.

The key to the new learning aid is that each set of questions is ordered by how much of the answer form and the answer fact is prompted by the question. As described above, there is a plurality of sets of questions. A member of the plurality of sets of questions is a set of questions. The set of questions is ordered by a plurality of prompt classes. A member of the plurality of prompt classes is a prompt class. The prompt class is ordered within the plurality of prompt classes by how much of the answer fact and the answer form is prompted.

In the example described above the first question 21 in the set of questions 20 is in a first prompt class. The first prompt class prompts a first answer form which is a yes-or-no answer form since a learner is expected to answer "yes" or "no." The first prompt class also prompts a first answer fact since the learner is expected to answer "no" if the fact in the question does not match a first cue answer fact, and is expected to answer "yes" when the fact in the question does match the first cue answer fact.

The second question 22 is in a second prompt class. The second prompt class prompts a second answer form since the learner is expected to repeat the form "is X" when the fact in the question matches a second cue answer fact. The second prompt class also prompts a second answer fact since the question contains a second answer fact which matches the second cue answer fact.

The third question 23 is in a third prompt class. The third prompt class prompts a third answer form since the question has the form "is Y" and the learner is expected to reply with the form "is X" using an "X" not prompted by the question. The third prompt class elicits a third answer fact but does not prompt the third answer fact since the question does not have a fact which matches a third cue answer fact. Only the cue prompts the third cue answer fact.

The fourth question 24 is in a fourth prompt class. The fourth prompt class elicits a fourth answer form but does not prompt the fourth answer form. The learner must provide the fourth answer form. The fourth prompt class also elicits a fourth answer fact but does not prompt the fourth answer fact, the cue prompts a fourth cue answer fact.

In the preferred form the set of questions has a question in each of the first four prompt classes. Equivalent learning aids with less prompt classes will be obvious hereafter. Questions 25 and 26 which are in a fifth prompt class and a sixth prompt class are not provided on every card in the preferred form.

The fifth question 25 is in a fifth prompt class which is like the first prompt class since the fifth prompt class also prompts a fifth answer form which is a yes-or-no answer form. The fifth prompt class differs from the first prompt class since the fifth prompt class prompts a fifth answer fact to match a fifth cue answer fact which is a secondary feature of the cue.

The sixth question 26 is in a sixth prompt class which is like the second prompt class since the sixth prompt class prompts for a sixth answer form which is like the second answer form "is X." The sixth prompt class is different from the second prompt class since the sixth prompt class prompts a sixth answer fact to match a sixth cue answer fact which is a secondary feature of the cue.

A cue prompts a first cue answer fact for the first prompt class, a second cue answer fact for the second prompt class, a third cue answer fact for the third prompt class, a fourth cue answer fact for the fourth prompt class, a fifth cue answer fact for the fifth prompt class, and a sixth cue answer fact for the sixth prompt class. In the example described the first, second, third, and fourth cue answer facts are all the apple itself. The cue answer facts can be different features of the cue, such as the parts of the apple. The fifth cue answer fact is referential because it refers to a learher's attitude toward apples. The sixth cue answer fact also refers to a quality of apples which is not shown by the cue itself. Many kinds of cues can be used and a cue can prompt many cue answer facts.

In one learning session the learners 14 and 15 can work through a pack of cards—for example, with questions and cues related to numbers—asking and answering questions in one of the prompt classes—for example, the second prompt class. In a later learning session the learners can work through a pack of cards asking and answering questions in another of the prompt classes—the third prompt class, for example. The plurality of sets of questions provides opportunities for many learning sessions working with a prompt class. The plurality of prompt classes provides opportunities for learning sessions to progress through the order of the plurality of prompt classes as learners' skills progress.

Other equivalent forms of means for providing questions and means for providing cues and other equivalent forms of prompt classes, will be obvious hereafter to persons skilled in the art. It is understood therefore that this invention is not limited to the particular examples illustrated here.

I claim:

1. A language learning method comprising the steps:
    providing a language learning aid, the language learning aid comprising:
        at least one card;
        a cue, the cue being provided on the card;
        a set of questions, the set of questions being provided on the card, the set of questions comprising:
            a full-prompt question, the full-prompt question eliciting a full-prompt answer, the full-prompt answer having a full-prompt answer form and having a full-prompt answer fact, the full-prompt answer form being a verb-plus-fact answer form and the full-prompt answer fact being a full-prompt cue answer fact, the full-prompt question prompting the full-prompt answer form and the full-prompt question prompting the full-prompt answer fact, and
            a part-prompt question, the part-prompt question eliciting a part-prompt answer, the part-prompt answer having a part-prompt answer form and having a part-prompt answer fact, the part-prompt answer form being the verb-plus-fact answer form and the part-prompt answer fact being a part-prompt cue answer fact, the part-prompt question prompting the part-prompt answer form, the part-prompt question not prompting the part-prompt answer fact;
    positioning the card so that the questions are visible to a first learner and the cue is visible to a second learner;
    saying aloud by the first learner of one of the set of questions; and
    responding aloud by the second learner.

2. The language learning method of claim 1 wherein the set of questions further comprises a yes-no-prompt question, the yes-no-prompt question eliciting a yes-no-prompt answer, the yes-no-prompt answer having a yes-no-prompt answer form and having a yes-no-prompt answer fact, the yes-no-prompt answer form being a yes-or-no answer form and the yes-no-prompt answer fact being a yes-no-prompt cue answer fact, the yes-no-prompt question prompting the yes-no-prompt answer form and the yes-no-prompt question prompting the yes-no-prompt answer fact.

3. The language learning method of claim 1 wherein the set of questions further comprises a no-prompt question, the no-prompt question eliciting a no-prompt answer, the no-prompt answer having a no-prompt answer form and having a no-prompt answer fact, the no-prompt answer form being the verb-plus-fact answer form and the no-prompt answer fact being a no-prompt cue answer fact, the no-prompt question not prompting the no-prompt answer form and the no-prompt question not prompting the no-prompt answer fact.

4. The language learning method of claim 1 wherein the set of questions further comprises a fifth question, the fifth question eliciting a fifth answer, the fifth answer having a fifth answer form and having a fifth answer fact, the fifth answer form being the yes-or-no answer form and the fifth answer fact being a fifth cue answer fact.

5. The language learning method of claim 1 wherein the set of questions further comprises a sixth question, the sixth question eliciting a sixth answer, the sixth answer having a sixth answer form and having a sixth answer fact, the sixth answer form being the verb-plus-fact answer form and the sixth answer fact being a sixth cue answer fact.

6. A language learning aid comprising:

at least one card;

a cue, the cue being provided on the card; and a set of questions, the set of questions being provided on the card, the set of questions comprising:

a full-prompt question, the full-prompt question eliciting a full-prompt answer, the full-prompt answer having a full-prompt answer form and having a full-prompt answer fact, the full-prompt answer form being a verb-plus-fact answer form and the full-prompt answer fact being a full-prompt cue answer fact, the full-prompt question prompting the full-prompt answer form and the full-prompt question prompting the full-prompt answer fact; and a part-prompt question, the part-prompt question eliciting a part-prompt answer, the part-prompt answer having a part-prompt answer form and having a part-prompt answer fact, the part-prompt answer form being the verb-plus-fact answer form and the part-prompt answer fact being a part-prompt cue answer fact, the part-prompt question prompting the part-prompt answer form, the part-prompt question not prompting the part-prompt answer fact.

7. The language learning aid of claim 6 wherein the set of questions further comprises a yes-no-prompt question, the yes-no-prompt question eliciting a yes-no-prompt answer, the yes-no-prompt answer having a yes-no-prompt answer form and having a yes-no-prompt answer fact, the yes-no-prompt answer form being a yes-or-no answer form and the yes-no-prompt answer fact being a yes-no-prompt cue answer fact, the yes-no-prompt question prompting the yes-no-prompt answer form and the yes-no-prompt question prompting the yes-no-prompt answer fact.

8. The language learning aid of claim 6 wherein the set of questions further comprises a no-prompt question, the no-prompt question eliciting a no-prompt answer, the no-prompt answer having a no-prompt answer form and having a no-prompt answer fact, the no-prompt answer form being the verb-plus-fact answer form and the no-prompt answer fact being a no-prompt cue answer fact, the no-prompt question not prompting the no-prompt answer form and the no-prompt question not prompting the no-prompt answer fact.

9. The language learning aid of claim 6 wherein the set of questions further comprises a fifth question, the fifth question eliciting a fifth answer, the fifth answer having a fifth answer form and having a fifth answer fact, the fifth answer form being the yes-or-no answer form and the fifth answer fact being a fifth cue answer fact.

10. The language learning aid of claim 9 wherein the set of questions further comprises a sixth question, the sixth question eliciting a sixth answer, the sixth answer having a sixth answer form and having a sixth answer fact, the sixth answer form being the verb-plus-fact.

* * * * *